H. H. Craigie.
Basin Trap.

No. 97,482. Patented Dec. 7, 1869.

Witnesses.
Geo. D. Walker
Chas H Smith

Inventor.
H. H. Craigie

United States Patent Office.

HUGH H. CRAIGIE, OF NEW YORK, N. Y.

Letters Patent No. 97,482, dated December 7, 1869; antedated November 25, 1869.

IMPROVEMENT IN BASIN-TRAP.

The Schedule referred to in these Letters Patent and making part of the same.

*To all whom it may concern:*

Be it known that I, HUGH H. CRAIGIE, of the city and State of New York, have invented and made a new and useful Improvement in Traps for Stationary Basins; and I do hereby declare the following to be a full, clear, and exact description of the said invention, reference being had to the annexed drawing, making part of this specification, wherein—

Similar marks of reference denote the same parts.

Figure 1:
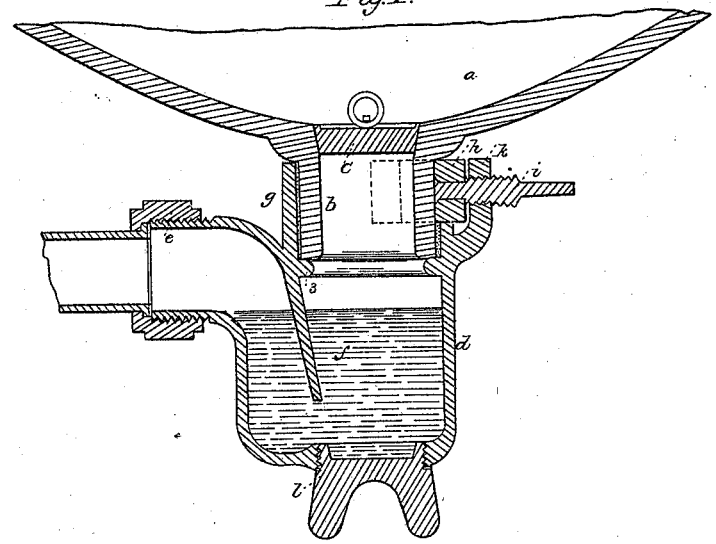
Figure 1 is a vertical section of said trap, as attached to a basin.
Figure 2:
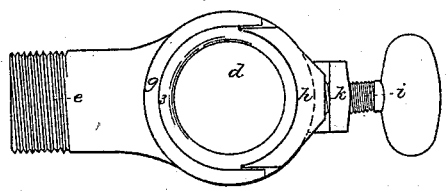
Figure 2 is a plan of the said trap.
Figure 3:
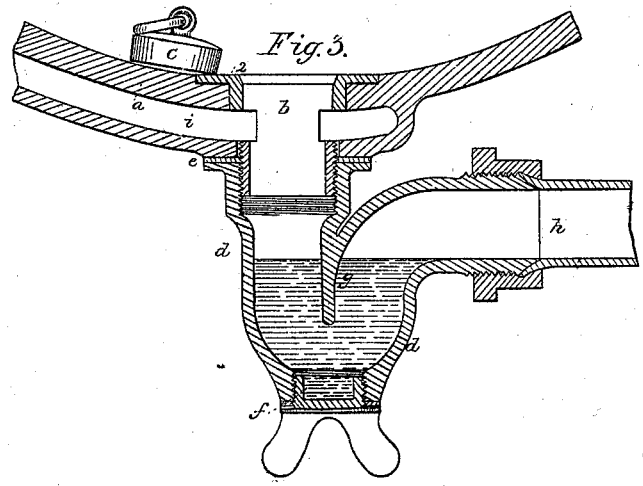

This invention is for the purpose of preventing the escape of noxious fumes from the sewer-pipe of stationary basins.

Some of the stationary basins that are now made, are formed with a short tubular horn or socket at the bottom of the basin, formed of porcelain or earthenware, in one piece with the rest of the basin.

Difficulty arises in connecting to this tube the pipe that leads to the sewer.

My improvement is designed with special reference to connecting the sewer-pipe to this character of a basin, and at the same time preventing smell passing out of the sewer-pipe.

My invention consists in a trap, with a coupling-connection for the sewer-pipe, in combination with a clamping-segment and socket, for the porcelain escape-tube of basins, whereby said trap can be securely attached to said basin with great facility.

In the drawing—

$a$ represents a portion of the lower part of a stationary basin.

$b$, the porcelain tube for the escape-water, and fitted to receive the plug $c$, in any usual manner.

$d$ is the trap, formed with the coupling-screw $e$, for the sewer-pipe, the dam $f$, to prevent smell passing from the sewer-pipe, and the socket $g$, at the upper end, for setting up around the tube $b$.

At one side of the socket $g$ is a movable section, $h$, acted upon by a clamping-screw, $i$, that passes through a projecting arm, $k$.

Putty is to be applied around the tube $b$, and then the trap-socket $g$ placed over the same, and the section $h$ firmly pressed against the side of $b$ by the screw $i$, to clamp the parts and hold the socket and trap firmly to the basin.

The inward flange 3 sustains the putty used for the packing.

The trap-screw $l$ allows the workman to smooth the putty that may project inwardly between $b$ and $g$, and if the trap becomes obstructed, said screw allows of its being cleaned.

What I claim, and desire to secure by Letters Patent, is—

The trap $d$, with the coupling $e$ and socket $g$, in combination with the segment $h$ and screw $i$, as and for the purposes set forth.

In witness whereof, I have hereunto set my signature, this 27th day of March, A. D. 1869.

H. H. CRAIGIE.

Witnesses:
CHAS. H. SMITH,
GEO. T. PINCKNEY.